United States Patent
Van Setten et al.

(10) Patent No.: US 10,406,506 B2
(45) Date of Patent: Sep. 10, 2019

(54) IN-LINE ROTOR-STATOR DISPERSER AND REACTION PROCESS

(71) Applicant: UMICORE AG & CO. KG, Hanau-Wolfgang (DE)

(72) Inventors: Barry Van Setten, Bad Soden-Salmuenster (DE); Sebastian Dahm, Fulda (DE); Liesbet Jongen, Waechtersbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 374 days.

(21) Appl. No.: 15/033,214

(22) PCT Filed: Oct. 29, 2014

(86) PCT No.: PCT/EP2014/073256
§ 371 (c)(1),
(2) Date: Apr. 29, 2016

(87) PCT Pub. No.: WO2015/063175
PCT Pub. Date: May 7, 2015

(65) Prior Publication Data
US 2016/0288098 A1    Oct. 6, 2016

(30) Foreign Application Priority Data
Nov. 1, 2013    (EP) ..................... 13005179

(51) Int. Cl.
*B01J 19/18*    (2006.01)
*B01F 7/26*    (2006.01)
(Continued)

(52) U.S. Cl.
CPC ............ *B01J 23/63* (2013.01); *B01D 53/945* (2013.01); *B01D 53/9454* (2013.01);
(Continued)

(58) Field of Classification Search
None
See application file for complete search history.

(56) References Cited

U.S. PATENT DOCUMENTS 2,009,957 A * 7/1935 Esch ................... B01F 7/00758
                                                    241/188.2
7,211,230 B2 * 5/2007 Zhou ........................ C01G 1/00
                                                    423/1
(Continued)

FOREIGN PATENT DOCUMENTS

EP    1489130 A1    12/2004
EP    1541220 A1     6/2005
(Continued)

OTHER PUBLICATIONS

Machine translation for JP 61-019310 A. Retrieved from JPO website on Oct. 29, 2018. (Year: 2018).*

(Continued)

*Primary Examiner* — Jennifer A Leung
(74) *Attorney, Agent, or Firm* — Smith, Gambrell & Russell, LLP (57) ABSTRACT

The present invention is directed to a special device for fast mixing and precipitation reactions of chemical substances. In particular, the present invention presents a reactor which allows an extremely fast mixing of at least two liquid streams containing highly concentrated dissolved materials from which solid metal compound particles are formed when at least two reactant streams meet, to which optionally a further stream, advantageously containing a dispersion or suspension, may be added.

20 Claims, 7 Drawing Sheets

(51) Int. Cl.
  *B01J 23/63* (2006.01)
  *B01J 19/00* (2006.01)
  *B01F 7/00* (2006.01)
  *B01F 15/02* (2006.01)
  *B01J 8/10* (2006.01)
  *B01D 53/94* (2006.01)
  *B01J 23/10* (2006.01)
  *B01J 37/03* (2006.01)
  *C01G 25/00* (2006.01)

(52) U.S. Cl.
  CPC ...... *B01F 7/00766* (2013.01); *B01F 15/0203* (2013.01); *B01J 8/10* (2013.01); *B01J 19/0066* (2013.01); *B01J 19/1806* (2013.01); *B01J 19/1887* (2013.01); *B01J 23/10* (2013.01); *B01J 37/031* (2013.01); *C01G 25/006* (2013.01); *B01D 2255/40* (2013.01); *B01D 2255/407* (2013.01); *B01D 2255/908* (2013.01)

(56) References Cited

U.S. PATENT DOCUMENTS

| | | | |
|---|---|---|---|
| 7,964,059 B2 * | 6/2011 | Peters | B01D 1/22 159/13.1 |
| 2004/0115123 A1 | 6/2004 | Zhou et al. | |
| 2004/0242764 A1 | 12/2004 | Yamada et al. | |
| 2011/0097252 A1 | 4/2011 | Larcher et al. | |
| 2011/0105719 A1 | 5/2011 | Gandhi et al. | |
| 2011/0158931 A1 * | 6/2011 | Wittek | B01F 3/0807 424/78.03 |
| 2011/0315601 A1 * | 12/2011 | Hassan | B01F 13/1016 208/85 |
| 2013/0052108 A1 | 2/2013 | Ifrah et al. | |

FOREIGN PATENT DOCUMENTS

| | | | | |
|---|---|---|---|---|
| GB | 1092363 | | 11/1967 | |
| GB | 2108407 A | * | 5/1983 | .......... B01J 19/1887 |
| JP | 61019310 A | * | 1/1986 | .......... B01F 7/00758 |
| JP | 2004-002732 A | | 1/2004 | |
| JP | 2004-533912 A | | 11/2004 | |
| JP | 2013-509299 A | | 3/2013 | |
| WO | 98/45212 A1 | | 10/1998 | |
| WO | 03/008083 A1 | | 1/2003 | |
| WO | 2011/083157 A1 | | 7/2011 | |

OTHER PUBLICATIONS

M. Perez et al., Implementation of classical nucleation and growth theory useful precipitation, Acta Materials 2008, (56), 2119-2132.
Peter Eastwood. Formulation of Three-Way Catalysts. Critical Topics in Exhaust Gas Aftertreatment, 1; Research Studies Press Ltd: Baldock, 2000. pp. 105-126.
J.A. Dumesic; G.W. Huber; M. Boudart; Introduction. In Handbook of Heterogeneous Catalysis, 2. G. Edited by Ertl, et al. WILEY-VCH Verlag GmbH & Co. KGaA: Weinheim, 2008. pp. 1-37.
F. Schüth; M. Hesse; K.U. Unger; Precipitation and Coprecipitation. In Handbook of Heterogeneous Catalysis, 2. Edited by Ertl, et al. WILEY-VCH VERLAG GmbH & Co. KGaA: Weinheim, 2008. pp. 100-119.
Written Opinion of the International Searching Authority for PCT/EP2014/073256 dated May 7, 2015 (7 pages).
International Preliminary Report on Patentability for PCT/EP2014/073256 dated May 3, 2016 (8 pages).
International Search Report for PCT/EP2014/073256, dated Feb. 9, 2015 in English Language.
Website: https://www.ikaprocess.com/en/Products/Pilot-plants-cph-40/magic-LAB-csb-MLAB/ accessed Aug. 22, 2018 (93 pages).
Office Action dated Nov. 5, 2018 in Japanese Patent Application No. 2016-526830 (3 pages in Japanese with English translation).

* cited by examiner

IN-LINE ROTOR-STATOR DISPERSER AND REACTION PROCESS

The present invention is directed to a special device for fast mixing and precipitation of chemical substances. In particular, the present invention presents a reactor which allows an extremely fast mixing of at least two liquid streams containing highly concentrated dissolved materials from which solid metal compound particles are formed when at least two reactant streams meet, to which optionally a further stream, advantageously containing a dispersion or suspension, may be added.

Mixing of chemicals in order to let them react with each other is a rather common area of physicochemical and technical research, especially for industrial scale purposes. In particular, with regard to reactions which are very fast, i.e. in the magnitude of 20 milliseconds or below, the problem of intense mixing of the reactants becomes crucial, because reactions normally run optimal in a homogenized reaction environment only. Much research has been invested in this field of technology (WO2011083157 A1; M. Zlokarnik in Ullmann's Encyclopedia of Industrial Chemistry. The problem of fast mixing and reaction of chemical compounds may become even more pronounced if the compounds produced have to be precipitated from supersaturated solutions.

Initially, a precipitation process typically produces small particles, as the crystal formation in the precipitation takes place very rapidly. It is well known that the reactions that occur include nucleation and growth, and that the reaction kinetics is influenced by the particles already present (M. Perez et al., Implementation of classical nucleation and growth theory useful precipitation, Acta Materials 2008, (56), 2119-2132).

Also conditions used during the precipitation process define the particle size and the structure of the particles. The process involves bringing dissolved materials to supersaturation while mixing. The mixing rate and level of supersaturation play an important role in particle size formation. Prior art mixing apparatus include impinging jet mixers, high pressure homogenizers, and static mixing followed by spray drying. None of these devices can be used in a continuous process, if the precipitation process is extremely fast and the resulting suspension is a non-Newtonian fluid. The non-Newtonian nature of the fluid causes precipitated particles to stick to the wall of the precipitation device if velocity gradients are small in the exit stream. Thus, clogging of the mixing apparatus can occur.

A solution to this problem is to reduce the volume of the reactor, however, at a certain point, e.g. small volume vessels and high material concentrations, this will typically lead to local or full blockage of the reactor system, which could mean inhomogeneous material or even a reactor that cannot be operated any more. Another solution to this problem is to operate the reaction at low concentrations of the dissolved materials, which is not desired because it is the general trend to intensify processes by raising the yield per processed volume, thereby improving cost-efficiency and sustainability.

Several patent applications deal with the problem of a fast mixing and precipitation of chemical substances. For example, WO03008083 A1 describes a process for the production of particles, in particular but not exclusively nano-particles, on a rotating surface reactor. The reactor is used to precipitate the material produced from a solution on a rotating surface. It is claimed that a tight size distribution may be manufactured in bulk and without the problems of agglomeration that is associated with traditional stirred-tank reactors.

A further method and a respective device for producing particles in a precipitation process is presented in US20110105719 A1. Here two reactant streams are supplied to a reactor comprising a stator assembly including two or more stators and a rotor assembly including two or more rotors. The device is construed such that the first stream of reactant material is supplied via the first inlet at a first radial location and a second inlet is foreseen to supply a second reactant material at a second radial location. Like in WO03008083 A1 the first inlet according to this device is placed at the axis of rotation of the rotor which actually resides in the middle of the device.

In-line rotor-stator dispersers are well-known equipments for dispersing single streams of chemicals. Rotor-stator dispersers for that purpose are for example produced by the company called IKA®. Said in-line rotor-stator dispersers are suited for various mixing and dispersing problems of chemicals. Different models exist for different material throughput, depending on the model the rotor may reach speeds of up to 26.000 RPM, thereby causing a turbulent flow nearby the rotor (Reynolds Number >10.000).

Nevertheless, still there exists a need for further installations which allow a fast mixing of at least two reactant materials in order to allow fast reaction and, in particular, subsequent precipitation steps. The device of the invention shall be able to provide a robust way to generate precipitations from solutions/suspensions of high material concentration in a continuous manner. The invention is particularly useful for precipitation reactions that occur in a very short time and may otherwise cause clogging of a reactor. In particular, the process of the present invention is deemed to produce a rather highly viscous product stream which has to be withdrawn from the reactor device in a robust and continuous manner, both on laboratory and industrial scale.

This objective is solved by a device characterized by the features of the instant invention. Further preferred aspects of the present invention are laid down in the instant application including an advantageous process of performing a fast mixing and precipitation reaction.

By applying a reactor device (1) for the fast mixing and precipitation of chemical substances comprising:

a housing defining an inlet zone (2);

one stator disc (3) comprising one or more rings (5) of spaced away teeth (7, 7') with openings to the bottom, concentrically located within the inlet zone (2) and fixed to the reactor device (1);

one rotor disc (4) comprising one or more rings (6) of spaced away teeth (8, 8') with openings to the top, configured for rotation about an axis of rotation (9) relative to the stator (3) and concentrically located within the inlet zone (2);

the spaced away teeth of the stator rings (7, 7') and the spaced away teeth of the rotor rings (8, 8') being alternatingly adjacent to each other in radial direction;

the stator rings (5) engaging the rotor rings (6) from the top in such a way that the openings of the spaced away teeth build the only communication of the inlet (10, 10') to the outlet (13), optionally starting with an interior rotor ring (6);

a first inlet (10) located eccentrically at a first radial location for supply of a first reactant material to the inlet zone (2);

at least one further inlet (10') located eccentrically at a radial location, different from the radial location of the other inlet for supply of at least one further reactant material to the inlet zone (2);

the materials supplied to the inlet zone (2) afterwards approaching the one or more rings of the stator and rotor (5, 6);

optionally a further inlet for supply of a further reactant material to the rotor (4)/stator (3) assembly located concentrically around the axis of rotation (9);

an outlet (13) to remove the product collected in the collector zone (12), wherein the first inlet (10) for supply of a first reactant material and the at least one further inlet (10') for supply of a further reactant material are located such that the reactant materials hit the spaced away teeth of the interior rotor ring (8) first after being supplied through the inlets (10, 10'), the problem underlying the present invention is solved in an extremely advantageous but nevertheless easy manner. Due to the fact that at least two material streams supplied to the reactor device are introduced into the device at a radially eccentric location they are simultaneously accelerated immediately when contacting the rotor disc (4) comprising the one or more rings (6). The streams are dissipated into small droplets first, which rapidly mix with each other to achieve an immediate homogeneous reaction environment rather easily. The only way the material can take to reach the outlet (13) is to penetrate the space between the teeth of rotor and stator rings (7, 7', 8, 8') and migrate through them to the outlet (13). As such the envisaged reaction takes place under now more advantageous reaction conditions.

The reactor device (1) can be built and adapted to the underlying chemical reaction according to the skills of the artisan. Preferable layouts can be depicted from the literature already cited here. In particular, the arrangement chosen in the presentation of the IKA® in-line dispersers can be taken as a basis to manufacture the device of the invention.

Figure 1:
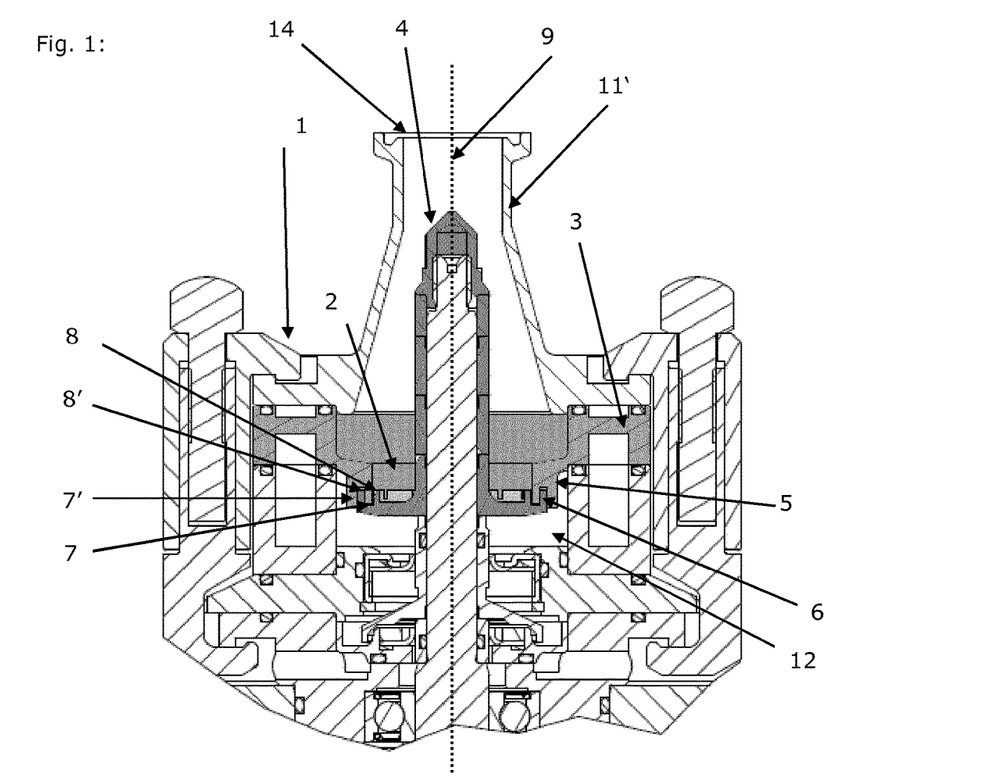
FIG. 1 exemplifies a reactor device of the present invention, based on the standard IKA® magic LAB® disperser, except for the correct arrangement of the inlets at the cover (11'). These are displayed in FIG. 2 rather, being located at an eccentric position compared to the rotor axis (9) and being fixed to the cover (11) of the reactor device (1). Exchange of 11 for 11' will lead to the reactor device of the present invention.

The stator disc (3) used in the present device is mainly composed of a metallic plate being open to the top which comprises one or more rings (5) of spaced away teeth (7, 7') with openings to the bottom, and which is located concentrically around the axis of rotation of the rotor and being fixed to the housing (1) (FIG. 1). The rings (5) comprise teeth-like obstacles (7, 7') having openings between the teeth, the openings being open to the bottom, implying a certain space between two adjacent teeth. In a favorable aspect, the present invention is directed to above mentioned device in which the spaced away teeth of the exterior stator ring have a distance to each other of 0.5-5 mm, preferably 0.6-3 mm and most preferably 0.75-2 mm (FIG. 4, teeth 7').

The rotor disc (4) used in the present apparatus is likewise composed out of shaped metal being closed to the bottom comprising one or more rings (6) of spaced away teeth (8, 8') with openings to the top, configured for rotation about an axis of rotation (9) relative to the stator (3) and concentrically located within the inlet zone (2). According to FIG. 1 the rotor rings (6) comprise space away teeth (8, 8') with their openings to the top carried by the rotor disc (4) showing a concave shape thereby forming the bottom of the inlet zone (2). This leads to the fact that the supplied reaction material being supplied to the inlet zone (2) is accelerated by the rotation of the rotor disc (4) and the impact of the centrifugal force serves to propel the material through the spaced away teeth (8) of the rotor disc (4), through the volume between first rotor ring and first stator ring (15), through the spaced away teeth (7) of the stator disc (3) through the volume between stator ring and rotor ring (16), and again through spaced away teeth (8') of the rotor disc (4), through the volume between rotor ring and stator ring (17) before meeting the final spaced away teeth (7') of the stator disc (3) if only two rings of spaced away teeth are applied per disc. Afterwards the product can enter the collector zone (12), where it can leave the reactor through the outlet (13) (FIG. 4). Further measures may advantageously be applied that enhance the acceleration of the reactant material hitting the bottom plate of the rotor disc (4) (e.g. like in US20110105719—as shown in FIG. 3 under #148).

Figure 4:
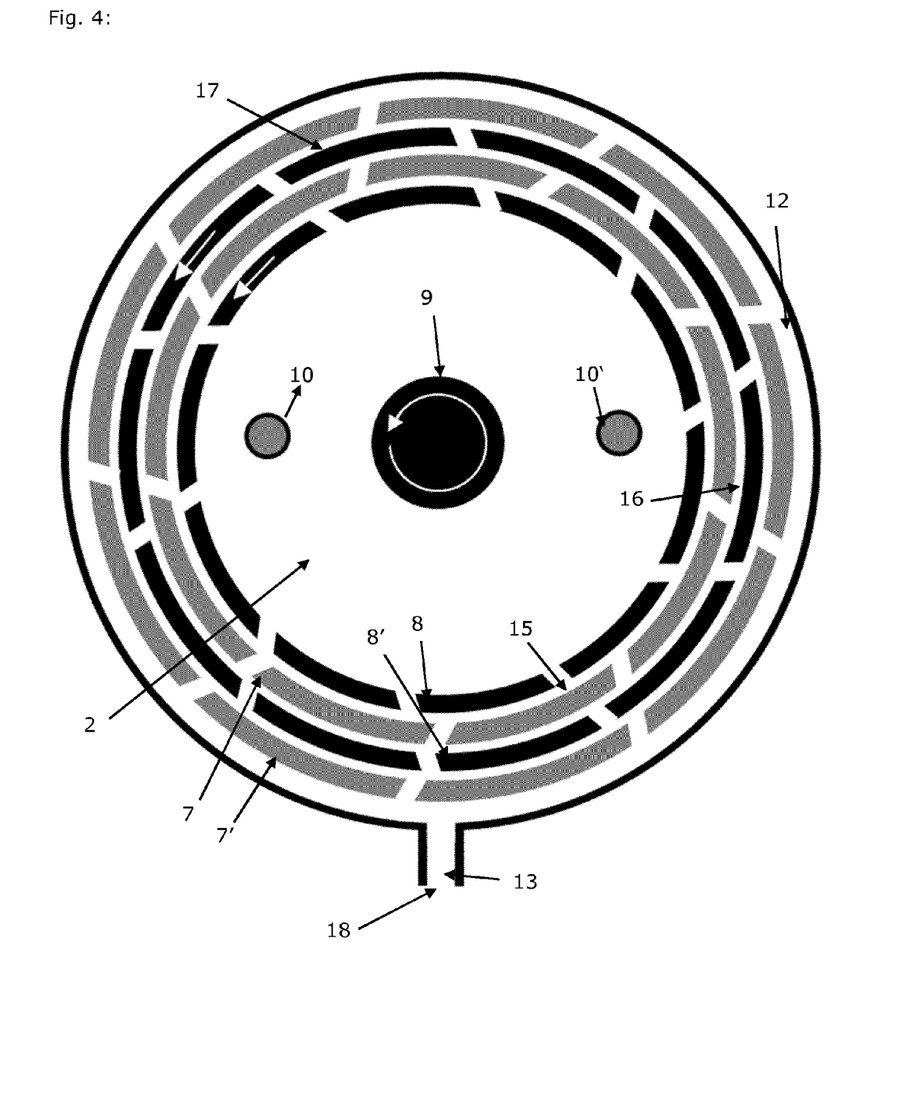
FIG. 4 shows a simplified top view on the teeth of the stator and rotor rings.

The one or more rings (6) of the rotor disc (4) comprise adjacent spaced away teeth (8, 8') which display openings between them of a certain length (FIG. 4). Preferably they have a distance to each other of 0.5-5 mm, preferably 0.6-3 mm and most preferably 0.75-2 mm (FIG. 4, teeth 8) at the interior ring of the rotor (4). For both, stator and the rotor rings, advantageously, one tooth and opening spans a total length of 4 to 25 mm, preferably 5 to 20 mm and most preferably 6 to 16 mm. The tooth to opening length ratio is preferably 2:1 to 12:1, more preferably 3:1 to 11:1 and most preferably 4:1 to 10:1. For the larger outer rotor and stator rings, the most preferred total length of each tooth with one opening is such that the number of openings of the rings is identical to the number of openings in the inner rotor ring. This mechanism applies equally regardless whether the inner ring is a stator ring (5) or a rotor ring (6), both embodiments being possible according to the present invention, whereby it is preferred that the interior ring is a rotor ring (6). It is deemed as a routine measure to adopt said values, which preferably relate to a reactor design having a diameter of approximately 10-20 cm, to other reactor dimensions and reaction problems.

Both the rotor ring openings and the stator ring openings may exhibit a certain shape which is selected from the group consisting of a rectangular, rhombic, trapezoid and round shape. The teeth and opening dimensions, form and direction may have an impact on the manner in which the precipitate is formed and of course on the particle size obtained. The skilled worker is able to accommodate both aspects in order to generate a favorable solution for his underlying problem.

Figure 3:
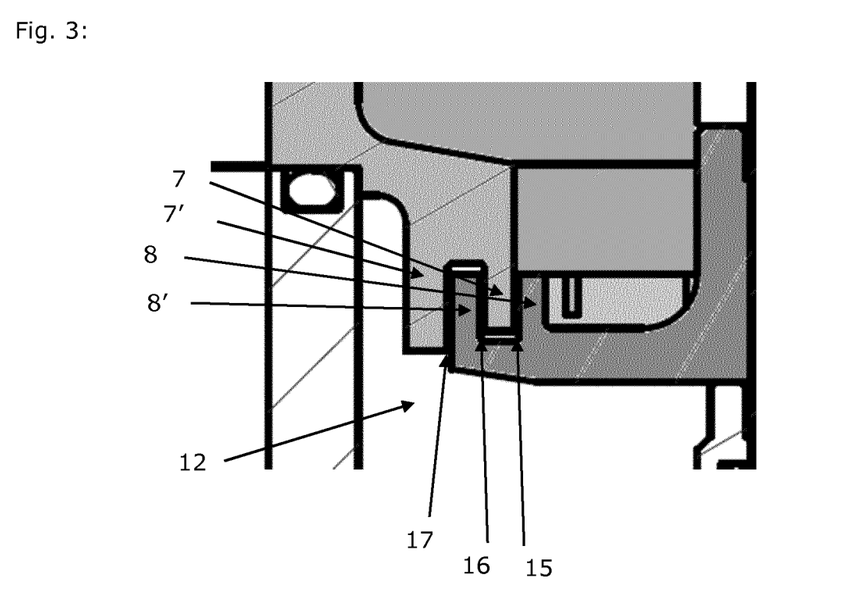
FIG. 3 further exemplifies the engagement of the stator spaced away teeth (7, 7') into the rotor spaced away teeth (8, 8').

To get a good mixing of the supplied materials a reactor device of the invention is preferred in which the rotating teeth of the rotor are in proximity to the non-rotating teeth of the stator, so high shear rates are induced in the interstitial volume (15, 16, 17). Hence, a reactor device is particularly preferred, wherein the spaced away teeth of the stator ring(s) (7 and 7') and the spaced away teeth of the rotor ring(s) (8 and 8') being adjacent to each other in radial direction form interstitial (15, 16, 17) spacings of between 0.05-2 mm, preferably 0.1-0.8 mm and most preferably 0.2-0.5 mm. FIG. 3 shows a zoomed part of FIG. 1, wherein the engagement of the spaced away teeth of the rotor rings and the stator rings are displayed in greater detail. FIG. 4 in top view perspective shows a simplified drawing of inlets (10, 10') for preferably liquids, the stator ring teeth (7, 7') and rotor rings teeth (8, 8'), interstitial volumes (15, 16, 17), collector zone (12) and reactor outlet (13). It can clearly be seen how the inlet zone (2) is shielded from the outlet through the connection of stator rings and rotor rings. Any material present in the inlet zone (2) has to leave the device of the invention through the rotating spaced away teeth of the rotor rings and the static spaced away teeth of the stator rings.

Figure 2:
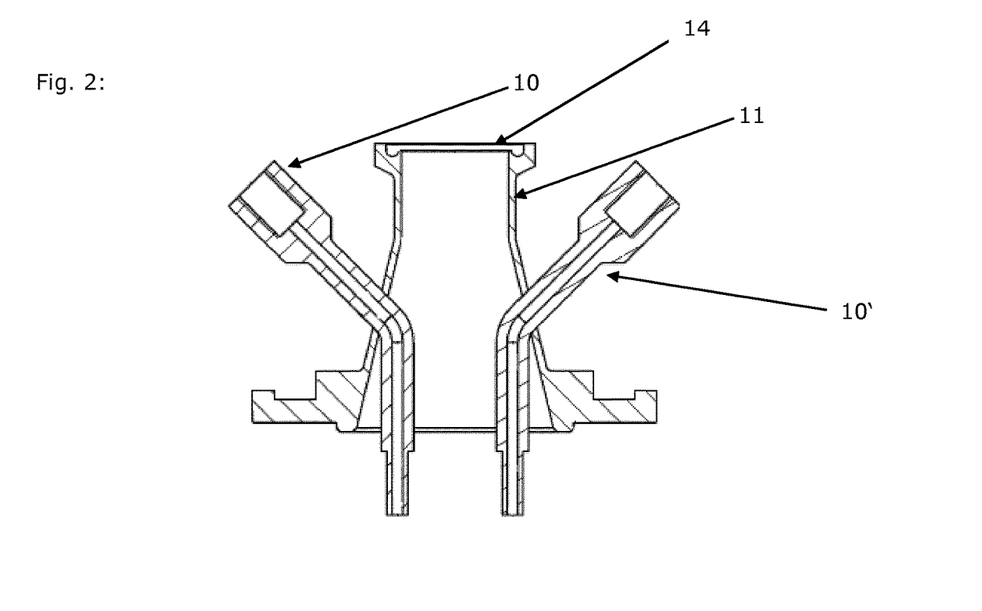

According to the present invention the first and at least one further inlet (10, 10') are eccentrically located at the cover (11) (FIG. 2). In a preferred aspect two inlets are present, whereby the supply of a first material is performed through the cover (11) by a first inlet (10) feed tube for preferably liquids and a second inlet (10') feed tube for supplying a further preferably also liquid material preferably different from the first one (FIG. 2). These two inlet supplies for different or equal reactant streams—in contrast to the prior art teachings where both eccentric streams have to be equal - are realized through eccentrically located feeding tubes providing said streams to the inlet zone (2). Preferably, the first inlet (10) for supply of a first reactant material and the at least one further inlet (10') for supply of at least one further reactant material are located such that taken their eccentric location the distance between them becomes maximum. In a preferred aspect the reactor device of the invention has two inlets, the first inlet (10) for supply of a first reactant material and the second inlet (10') for supply of a second reactant material both being located on opposite sides, preferably symmetrically, relative to the rotor axis (9).

According to the invention the first inlet (10) for supply of a first reactant material and the at least one further inlet (10') for supply of a further reactant material are located such that the reactant materials hit the spaced away teeth of the interior rotor ring (8) first after being supplied through the inlets. Preferably, in this embodiment two inlets are present and symmetrically arranged as depicted above. Thereby, it is secured that the acceleration of the reactant material and its breakdown into small droplets is conducted before the materials supplied meet each other for further reaction. This serves in an advantageous manner for the fact that extremely high concentrations which lead to high viscosities of the resulting reaction material can be dealt with in a superior way. The material produced is collected in zone (12) and can be withdrawn from the outlet (13) according to the knowledge of the skilled worker.

The cover (11) may optionally be used for possessing a still further inlet (14) for supply of a still further reactant material to the inlet zone (2) at a location concentrically around the axis of rotation (9) (FIG. 2). Through this inlet (14) preferably aqueous suspensions and/or dispersions already containing solid particles on which a precipitation should take place can be supplied. Said solid particles may e.g. be materials normally taken as support material in automotive exhaust catalysis, like rare earth oxides, refractory metal oxides, mixed oxides, zeolytic material, and mixtures thereof. These may contain amongst others silica, alumina, cerium oxide, cerium-zirconium oxide, cerium-zirconium oxide doped with other rare earth oxides, lanthana-alumina, zeolites, zeotypes, titanium oxide and mixtures thereof. If this further inlet is not in use it may simply be plugged.

In a further embodiment of the present invention a process for fast reaction and precipitation of chemical substances is suggested, wherein at least two materials are supplied to the reactor according to the invention through the first and at least one further inlet (10, 10'), and optionally through inlet (14), and the finished product is collected from the outlet (13) of the device. The material to be supplied through inlet (14) can be advantageously a dispersions or suspension. It is plain clear that the advantageous and preferred aspects just mentioned for the reactor device (1) are likewise applicable to instant process.

In a further preferred embodiment of instant process, a suspension and/or dispersion of the materials for precipitation already been mixed out of the slurry of support material and the reactant to be precipitated may be fed through inlet (14) and the further material for initiation of the precipitation of said reactant can be added through one or both inlets (10) and (10').

The product produced according to this invention is preferably a small metal compound particle of an anion selected from the group consisting of hydroxide, oxy-hydroxide, oxide and mixtures thereof and of a metal cation selected from the group consisting of aluminum, zirconium, copper, iron, cobalt, nickel, manganese, rare earths, in particular cerium, lanthanum, yttrium, praseodymium, neodymium, and mixtures thereof. These materials may act as a support for materials active in automotive catalysis like e.g. precious metals, in particular platinum, palladium, and rhodium or alkaline earths like e.g. barium and strontium or rare earths like cerium or mixed oxides like e.g. cerium-zirconium oxides. The support materials carrying the materials active in automotive catalysis may be generated in situ in a one stage process applying the device of the present invention. It is also possible that a dispersion or suspension of support materials are introduced through inlet (14) and solutions for precipitating the active materials onto the support are introduces through inlets 10 and 10' thereby forming the precursor catalyst.

The process of the present invention can be applied to all chemical reactions where at least two advantageously liquid solutions and optionally a dispersion or suspension are to be mixed and precipitated together. The device can be applied preferably to obtain medium to high viscos suspensions of precursors for catalyst materials having a viscosity of ≥50 Pa×s–100 Pa×s.

Within the boundaries of the present invention the skilled worker understands that fast mixing and precipitating serving for a fast reaction is most viable for those reactions which preferably happen within a timescale of milliseconds, more preferably below 20 milliseconds and still more preferred below 10 milliseconds (for $t_{1/2}$). The reactions being focused on here are preferably those which are attributed to the class of neutralization reactions. In this regard acid-base reactions that form metal hydroxides are extremely preferred. These reactions are known to the skilled worker (F. Schüth; M. Hesse; K. U. Unger; Precipitation and Coprecipitation. In Handbook of Heterogeneous Catalysis, 2; G. Ertl, H. Knözinger, F. Schüth, J. Weitkamp, Eds.; WILEY-VCH Verlag GmbH & Co. KGaA: Weinheim, 2008; 1, 100-119).

In a very preferred process the produced material is a small metal-hydroxide particle selected from the group consisting of aluminium, zirconium, copper, iron, cobalt, nickel, manganese, rare earths (for instance cerium, lanthanum, yttrium, praseodymium, neodymium), precious metals (for instance platinum, palladium, and rhodium) and mixtures thereof.—Said produced material is typically separated from the liquid in which it was precipitated, washed, dried and calcined.

Zeolites are microporous crystalline aluminosilicate materials characterised by well-ordered 3-D structures with uniform pore/channel/cage structures of 3 to 10 Angstrom (depending on framework type) and the ability to undergo ion exchange to enable the dispersion of catalytically active cations through-out the structure.

Zeotypes are structural isotypes/isomorphs of Zeolites but instead of a framework structure derived of linked Silica and Alumina tetrahedra they are based upon for example: alumina-phosphate (ALPO), silica-alumina-phosphate (SAPO), metal-alumina-phosphate (Me-ALPO) or metal-silica-alumina-phosphate (MeAPSO).

Zeolytic material is a material based upon the structural formalisms of zeolites or zeotypes.

Compared to classic precipitation tanks the reactor of the present invention is advantageously applied for those reactions which produce a viscous material (≥50 to 100 Paxs) through fast mixing and precipitation steps. Most advantageously, the reactor is operated in such a way that very high viscosities (above 100 Paxs) are avoided. In some cases the high viscosity status of a material depends on the pH of a suspension. Because it is possible in instant process to fix the pH of the suspension at a predefined value extremely fast, pH regions which cause high viscous products can be favorably avoided. This is easier to accomplish than with e.g. a stirred tank reactor.

At the eccentric position where the solutions are supplied to the device of the invention the rotor already has a huge radial speed and hence is able to accelerate the solutions supplied right away. The formation of small reactant containing compartments and the time for mixing of the material streams is thus enhanced to a considerable extent. This leads to rather homogenous, small particles in the formed precipitate and the ability to handle a product stream of a rather highly viscous nature in a continuous manner. This combination makes the reactor of the invention ideal for the process intensification of the production of catalyst materials, e.g. for automotive exhaust purification purposes. Catalysts are known to have small particle sizes to achieve high surface areas (I A. Dumesic; G. W. Huber; M. Boudart; Introduction. In Handbook of Heterogeneous Catalysis, 2; G. Ertl, H. Knözinger, F. Schüth, J. Weitkamp, Eds.; WILEY-VCH Verlag GmbH & Co. KGaA: Weinheim, 2008; 1, 1-2). In the preferred arrangement in which the material streams to be reacted are supplied directly to the interior rotor ring and its spaced away teeth, one is able to further emphasize the advantages of the present invention. This was neither anticipated not made obvious through the prior art teachings.

EXAMPLE 1

This example relates to the preparation of a three-way catalyst for purifying the exhaust gas of a gasoline engine. The activity of the three-way catalyst is known to the skilled worker to be a function of various parameters amongst which, precious metal composition, dispersion, washcoat composition, and oxygen storage capacity (OSC) (Peter Eastwood; The exhaust environment, *Critical Topics in Exhaust Gas Aftertreatment,* 1; Research Studies Press Ltd: Baldock, 2000).

An OSC material that contained cerium, zirconium, lanthanum and praseodymium oxides (US2011/0097252 A1) was prepared with a composition of, by weight of the oxides: 40% $CeO_2$, 50% $ZrO_2$, 5% $Pr_2O_3$, 5% $La_2O_3$.

A mixed metal nitrate solution was prepared as follows. Solid nitrates were added to 3988.0 g deionised water: 2038.6 g $(NH_4)_2Ce(NO_3)_6$, 212.6 g $La(NO_3)_3 \cdot 6H_2O$ and 211.0 g $Pr(NO_3)_3 \cdot 6H_2O$. Zr was added to the solution as 4000.0 g of an aqueous solution of Zirconylnitrate containing 20% Zr by weight of the oxide. The resulting solution was gently stirred for 1 hour.

As base an aqueous 25 wt % $NH_3$ solution was used.

As reactor a standard IKA® magic LAB® disperser with one rotor with two rings of spaced away teeth (8 and 8') and one stator with two rings of spaced away teeth (7 and 7') was used. The standard cover was replaced by a cover that has a first liquid inlet (10) and a second liquid inlet (10'), FIG. 2. The rotor ring was rotated at 8235 rpm.

The mixed metal solution was connected to the first liquid inlet (10), the base was connected to the secondary inlet (10'). The auxiliary inlet (14) was closed. A pH electrode was placed at the reactor outlet (18).

The base was pumped with a gear pump at a rate of 100 g/min. The metal nitrate solution was pumped with a peristaltic pump at a rate of 330 g/min.

The pH was approximately 8.5. The precipitate leaving the reactor outlet (13) was collected in a beaker that was gently stirred with an anchor stirrer.

When the reaction was finished, 529 g lauric acid powder (WO98/45212 A1) was added and the precipitate was stirred for 1 hour and then filtered in a Büchner filter. The cake was washed with 9.6 l deionised water.

The washed cake was dried at 110° C. for 24 hours, dry milled to a particles size of <500 μm, and calcined in air at 600° C. for 4 hours.

Figure 5:
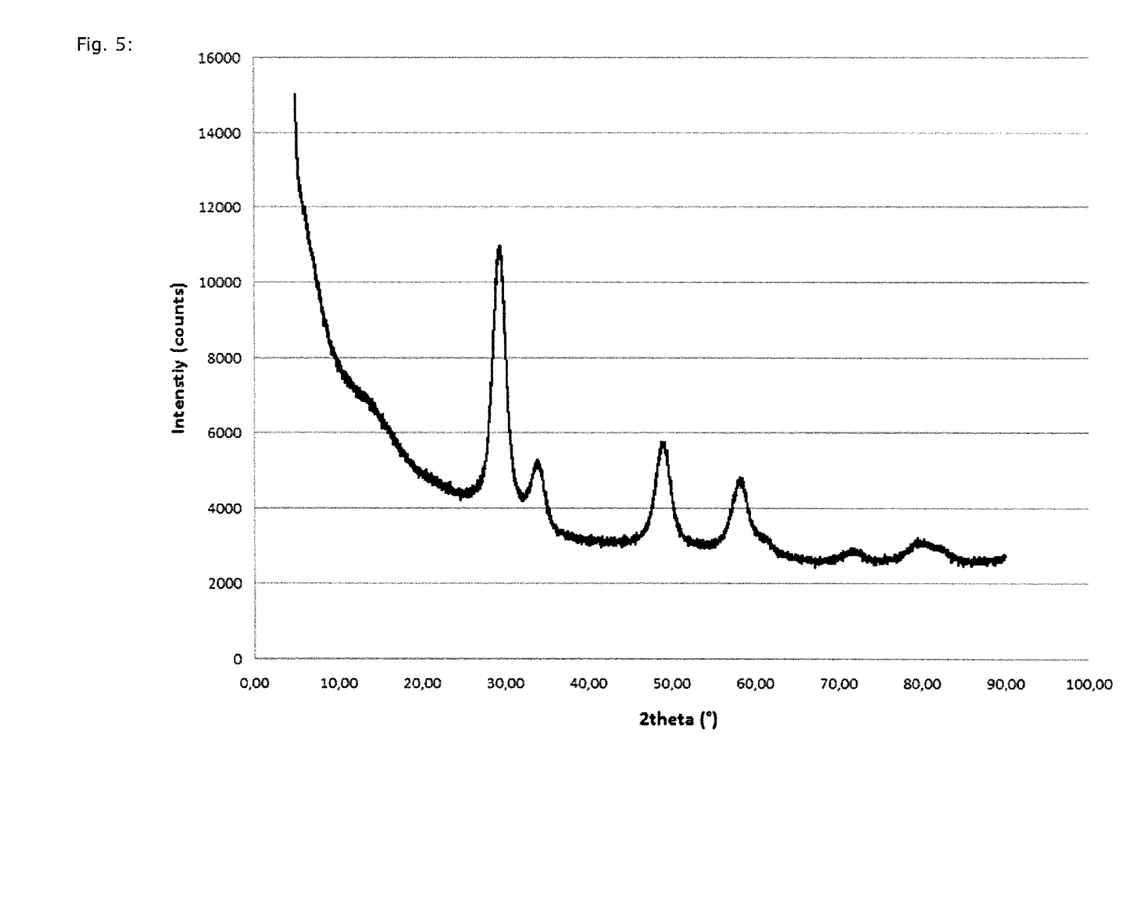
FIG. 5 shows the XRD diffraction pattern of the OSC material prepared in Example 1 with the rotor-stator reactor of the present invention.

The prepared material was analyzed by standard X-ray diffraction (XRD) and standard $N_2$ physisorption (BET) method. The XRD data reveals a substantial phase pure material (>95%; FIG. 5). The crystallite size of the as-prepared material was determined using the line broadening/Scherrer equation and is 4.5 nm. The fresh surface area is 113 $m^2/g$.

A washcoat was made by mixing together the prepared OSC material, Barium Sulfate, Lanthanum Acetate, Lanthanum doped Alumina, Palladium Nitrate, Rhodium Nitrate, Acetic Acid and Tetraethylammonium Hydroxide. The wash-coat was milled by means of a DYNO®-MILL to an average particle diameter $d_{50}$ of <6 μm and $d_{90}$ of <20 μm.

A cordierite flow-through honeycomb substrate, whose channels were open at both ends, was used as support for the washcoat. The substrate had a length of 15.24 cm, a diameter of 10.16 cm, a cell density of 93 $cm^{-2}$ and a wall-thickness of 0.1 mm.

The three-way catalyst was prepared by dipping the substrate into the wash-coat, let the excess washcoat drain off, blow out excess washcoat with pressurized air, dry the substrate in an air flow at 120° C. for 30 min, and calcine in static air at 500° C. for 4 h. The calcined washcoat amount of the catalyst was 659 g, with a composition of 45.32% of the prepared OSC material, 7.31% $BaSO_4$, 2.39% $La_2O_3$, 43.85% $Al_2O_3$, 0.92% Pd and 0.08% Rh.

The three-way catalyst was aged by means of a fuel-cut aging (similar to EP1541220 A1) for 38 h at 950° C.

Figure 6:
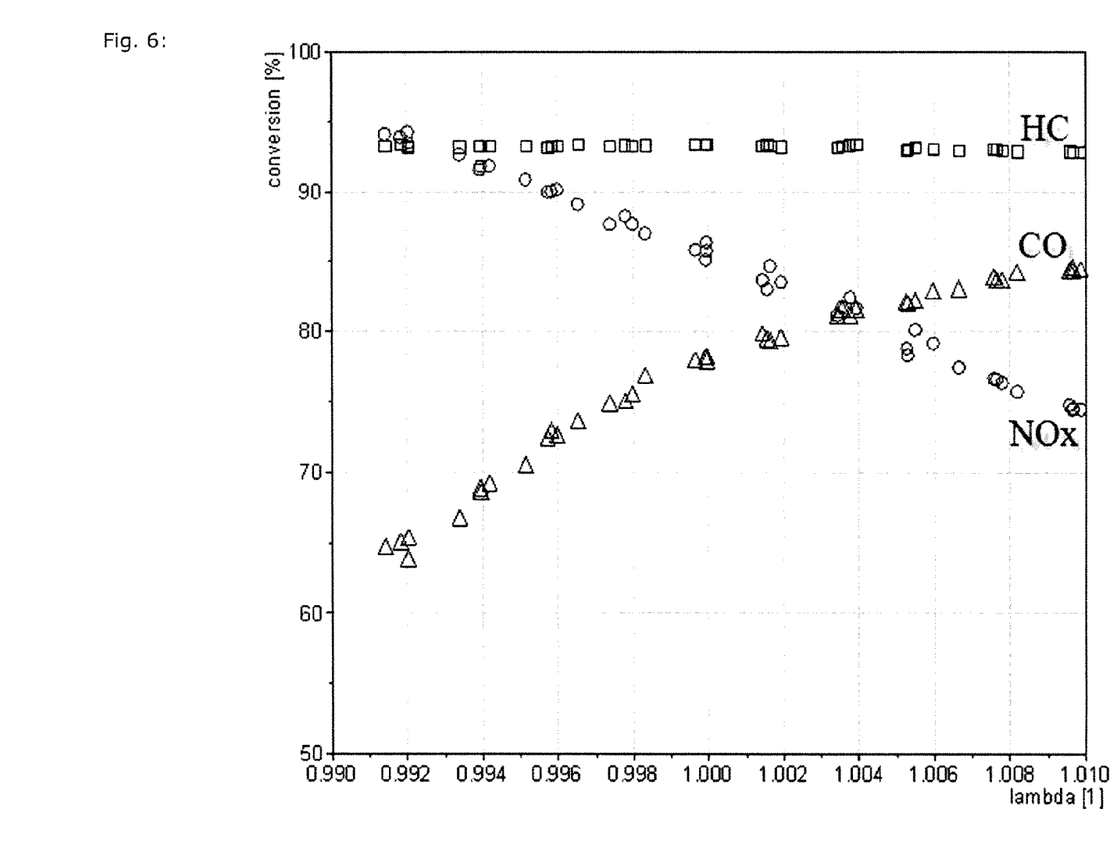
FIG. 6 depicts the conversion efficiency for CO, NO$_x$ and HC in the Lambda window of Lambda values of 0.990 to 1.010 of the aged three-way catalyst containing the OSC material prepared in Example 1 with the rotor-stator reactor of the present invention.

It is known in the art that the optimal conversion efficiency of a three-way catalyst for carbon monoxide (CO), unburned hydrocarbons (HC), and nitrogen oxides ($NO_x$) lies within the narrow band of air-fuel ratio around stochiometry, known as the "Lambda Window" (Peter Eastwood; The exhaust environment, Critical Topics in Exhaust Gas Aftertreatment, 1; Research Studies Press Ltd: Baldock, 2000; 25). The conversion efficiency of the aged catalyst at 450° C. was tested by sweeping the Lamba value of the exhaust gas of a gasoline engine in the Lambda Window from Lambda values 0.990 to 1.010. During the sweeping, the exhaust composition upstream and downstream the catalyst was measured with exhaust gas analyzers. In the Lambda window an average CO conversion of 77%, NOx 85% and HC 93% was determined (FIG. 6).

COMPARATIVE EXAMPLE 1

This example relates to the preparation of a reference three-way catalyst that contains a commercially available OSC material with the same composition as the OSC material in Example 1. More specifically an Optalys™ OSC material of Solvay Rhodia was used as commercial reference material.

Figure 7:
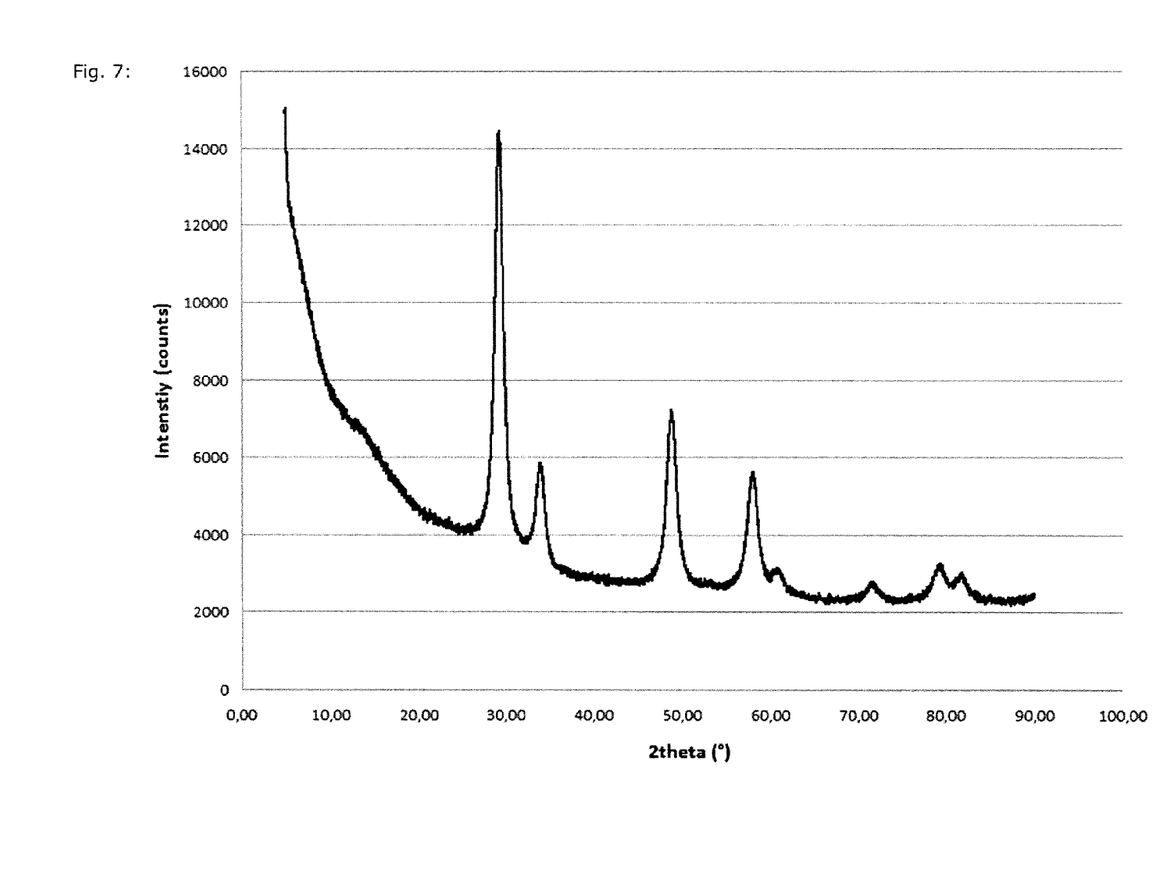
FIG. 7 shows the XRD diffraction pattern of the reference OSC material of Example 2.
Figure 8:
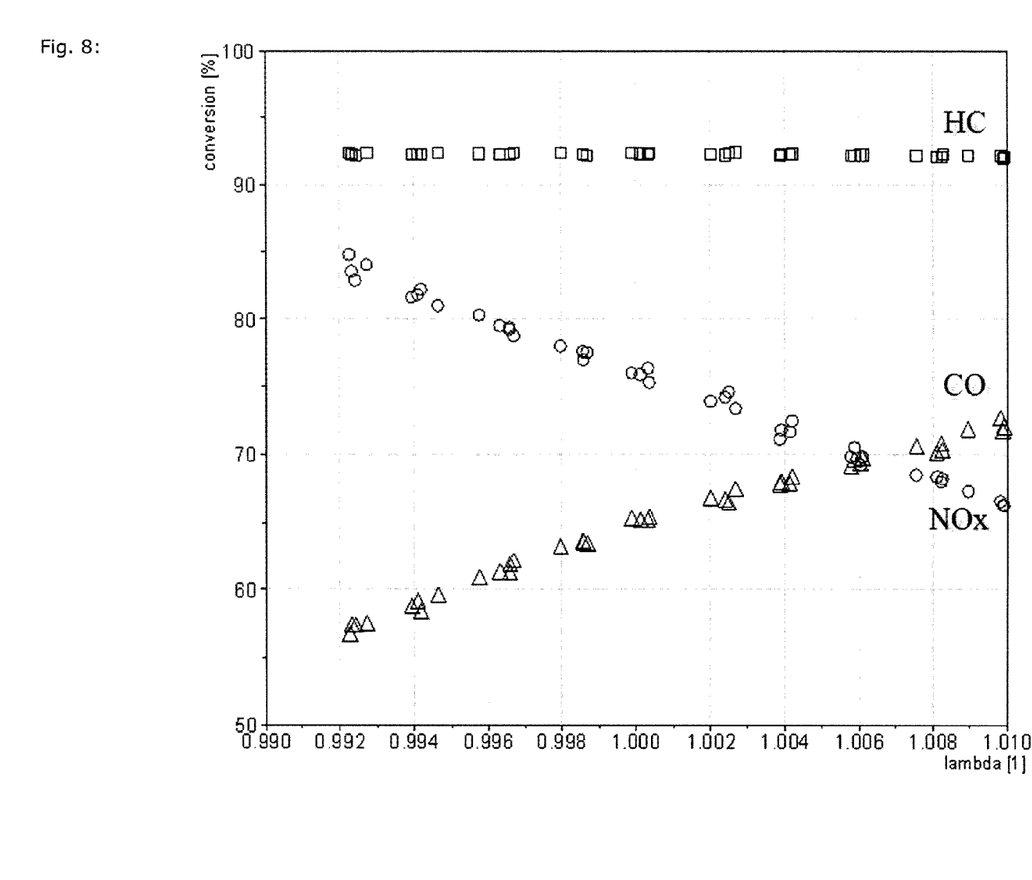
FIG. 8 lays out the conversion efficiency for CO, NO$_x$ and HC in the Lambda window of Lambda values of 0.990 to 1.010 of the aged three-way catalyst containing the reference OSC material prepared in Example 2.

Said commercially available material was measured using the same methods as in example 1, XRD (FIG. 7) and BET, and showed a fresh crystallite size of 7.3 nm and a fresh surface area of 81 m$^2$/g.

With said commercially available OSC material, a three-way catalyst was prepared and aged according to Example 1. The conversion of CO, NO$_x$ and HC at 450° C. was measured according to example 1. In the Lambda window an average CO conversion of 65%, NO$_x$ 75% and HC 92% was measured (FIG. 6).

EXAMPLE 1 and COMPARATIVE EXAMPLE 1

It is clear from Example 1 and Comparative Example 1 that the OSC material prepared with the rotor-stator device of the present invention from example 1 was better dispersed, because it had smaller particles and a higher specific surface area than the commercial material with the same composition from comparative example 1. This better dispersion of the OSC material from the rotor-stator reactor led to a superior three-way catalyst performance in the Lambda window. It is clear from the comparison between example 1 and comparative example 1 that the rotor-stator reactor leads to better disperser catalytic materials with superior performance.

NUMERALS IN THE FIGS. 1 TO 4

1 Reactor device
2 Inlet zone
3 Stator
4 Rotor
5 Stator ring
6 Rotor ring
7 Spaced away teeth of first (inner) stator ring
7' Spaced away teeth of optional second stator ring. (7" for third stator ring and so on)
8 Spaced away teeth of first (interior) rotor ring
8' Spaced away teeth of optional second rotor ring. (8" for third rotor ring and so on.)
9 Rotatory axis
10, 10' Inlet for first and second liquid reactant
11, 11' Cover of reactor device
12 Collector zone
13 Reactor outlet
14 Optional inlet at central position
15 Interstitial volume between first rotor ring and first stator ring
16 Interstitial volume between first stator ring and second rotor ring
17 Interstitial volume between second rotor ring and second stator ring
18 Position for placing pH electrode at reactor outlet

What is claimed is:

1. A reactor device for the fast reaction and precipitation of chemical substances comprising:
   a housing defining an inlet zone;
   one stator disc comprising one or more stator rings of spaced apart teeth with openings to the bottom, concentrically located within the inlet zone and fixed to the reactor device;
   one rotor disc comprising one or more rotor rings of spaced apart teeth with openings to the top, configured for rotation about an axis of rotation relative to the stator disc and concentrically located within the inlet zone;
   the spaced apart teeth of the one or more stator rings and the spaced apart teeth of the one or more rotor rings being alternatingly adjacent to each other in radial direction;
   the one or more stator rings engaging the one or more rotor rings from the top in such a way that the openings of the spaced apart teeth build the only communication of the inlet zone to a collector zone in communication with an outlet of the reactor device;
   a first inlet located eccentrically at a first radial location for supply of a first reactant material to the inlet zone;
   at least one further inlet located eccentrically at a radial location, different from the radial location of the other inlet for supply of at least one further reactant material to the inlet;
   the outlet being configured for the removal of the product collected in the collector zone;
   wherein the first inlet for supply of a first reactant material and the at least one further inlet for supply of a further reactant material are located such that the reactant materials hit the spaced apart teeth of a radial interior most positioned rotor ring after being supplied through the inlets and prior contact with the interior most positioned stator ring, and wherein the first inlet and the at least one further inlet are configured such that the first reactant material and the at least one further reactant material make contact on respective, different teeth of the radial interior most positioned rotor ring prior to coming into mixing, reacting contact.

2. The reactor device according to claim 1, wherein the spaced apart teeth of an exterior stator ring have a distance to each other of 0.5-5 mm.

3. The reactor device according to claim 1, wherein the spaced apart teeth of an interior rotor ring have a distance to each other of 0.5-5 mm.

4. The reactor device according to claim 1, wherein the spaced apart teeth, of the stator ring and the rotor ring have a shape selected from the group consisting of rectangular, rhombic, trapezoid and round shape.

5. The reactor device according to claim 1, wherein the spaced apart teeth of the stator rings and the spaced apart teeth of the rotor rings are alternatingly adjacent to each other in the radial direction and have an interstitial spacing of between 0.05-2 mm.

6. The reactor device according to claim 1, wherein the first inlet for supply of a first reactant material and the at least one further inlet for supply of at least one further reactant material are located as to be diametrically opposed on a circle encircling a central axis of the rotor disc.

7. The reactor device according to claim 1 wherein the first inlet for supply of a first reactant material and the at least one further inlet for supply of at least one further reactant material have outlet conduit sections that each extend along a vertical axis as to extend in relative parallel fashion.

8. The reactor device according to claim 1 wherein the first inlet for supply of a first reactant material and the at least one further inlet for supply of at least one further reactant material have outlet conduit sections that are arranged to supply respective reactant material into the reactor device at radially eccentric locations.

9. The reactor device according to claim 1 wherein the first inlet for supply of a first reactant material and the at least one further inlet for supply of at least one further reactant material have outlet conduit sections that are arranged relative to the rotor disc as to have the first reactant material and the at least one further reactant material initially supplied to the rotor disc at eccentric locations on the rotor disc such that initial mixing is carried out with circular and radial, centrifugal motion generated by the rotor disc.

10. The reactor device according to claim 1 wherein the first inlet for supply of a first reactant material and the at least one further inlet for supply of at least one further reactant material have outlet conduit sections that extend below an upper surface of the stator disc.

11. The reactor device according to claim 1 wherein, in addition to the first inlet for supply of a first reactant material and the at least one further inlet for supply of at least one further reactant material reactant at eccentric locations on the rotor disc, there is provided a third inlet configured to supply an additional reactant material along a rotation axis of the rotor disc.

12. The reactor device of claim 1 wherein said first inlet and said at least one further inlet are radially spaced from the axis of rotation as to be closer to the rotor ring than the axis of rotation.

13. Process for fast reaction and precipitation of chemical substances, comprising supplying at least two materials to the reactor device of claim 1 through the first and at least one further inlet, and collecting the product from the outlet of the reactor device.

14. Process according to claim 13, wherein supplying the at least two materials results in the produced product being a metal compound particle of an anion selected from the group consisting of hydroxide, oxy-hydroxide, oxide, and mixtures thereof and of a metal cation selected from the group consisting of aluminum, zirconium, copper, iron, cobalt, nickel, manganese, barium, rare earths, and mixtures thereof.

15. Process according to claim 13, wherein supplying the at least two materials results in a production of a viscous suspension of precursors for catalyst materials having a viscosity of >50 Pa×s.

16. A reactor device for fast reaction and precipitation of a chemical substance comprising:
a housing defining an inlet zone;
one stator disc comprising one or more stator rings of spaced apart teeth defining openings to the bottom, concentrically located within the inlet zone and fixed to the reactor device;
one rotor disc comprising one or more rotor rings of spaced apart teeth defining openings to the top, configured for rotation about an axis of rotation relative to the stator disc and concentrically located within the inlet zone;
the spaced apart teeth of the one or more stator rings and the spaced apart teeth of the one or more rotor rings are alternatingly adjacent to each other in the radial direction;
the one or more stator rings being arranged to engage the one or more rotor rings from the top in such a way that the openings of the spaced away teeth build the only communication of the inlet zone to a collector zone in communication with an outlet of the reactor device;
a first inlet located eccentrically at a first radial location for supply of a first reactant material to the inlet zone;
at least one further inlet located eccentrically at a radial location, different from the radial location of the other inlet for supply of at least one further reactant material to the inlet zone;
the outlet being configured for the removal of product collected in the collector zone;
wherein the first inlet for supply of a first reactant material and the at least one further inlet for supply of a further reactant material are located such that the reactant materials first hit the spaced apart teeth of a radial interior most positioned rotor ring after being supplied through the inlets, and wherein the first inlet and the at least one further inlet are configured relative to the rotor disc such that the first reactant material and the at least one further reactant material make contact with the spaced apart teeth of the radial interior most rotor ring while travelling radially outward within the inlet zone such that the first reactant material and the at least one further reactant material initiate a reactive mixing after the respective breaking down into the droplets following contact with the spaced apart teeth of the radical interior most positioned to the rotor ring.

17. A reactor device for the fast reaction and precipitation of chemical substances comprising:
a housing defining an inlet zone;
one stator disc comprising one or more stator rings of spaced apart teeth concentrically located within the inlet zone and fixed to the reactor device;
one rotor disc comprising one or more rotor rings of spaced apart teeth configured for rotation about an axis of rotation relative to the stator disc and concentrically located within the inlet zone;
the spaced apart teeth of the one or more stator rings and the spaced apart teeth of the one or more rotor rings being alternatingly adjacent to each other in radial direction;
the one or more stator rings being arranged relative to the one or more rotor rings as to be in an overlapping relationship along the axis of rotation whereby the openings of the spaced apart teeth build the only communication of the inlet zone to a collector zone in communication with an outlet of the reactor device, and wherein the teeth in the radial interior most positioned one of the one or more stator and rotor rings have circumferential lengths that are greater than that of gaps formed between adjacent pairs of spaced apart teeth in said radial interior most positioned one of the one or more stator and rotor rings;

a first inlet located eccentrically at a first radial location for supply of a first reactant material to the inlet zone;

at least one further inlet located eccentrically at a radial location, different from the radial location of the other inlet for supply of at least one further reactant material to the inlet;

the outlet being configured for the removal of the product collected in the collector zone;

wherein the first inlet for supply of a first reactant material and the at least one further inlet for supply of a further reactant material are located such that the reactant materials flow radially out along different radials as to hit respective, different circumferentially spaced teeth of the radial interior most positioned one of the one or more stator and rotor rings after being supplied through the inlets and prior to the first reactant material and the further reactant material coming into initial mixing, reacting contact.

18. The reactor device according to claim 17, wherein the radial interior most positioned one of the one or more stator and rotor rings is an interior rotor ring such that the first reactant material and the at least one further reactant material make contact on teeth of the interior rotor ring and initiate a reactive mixing after breaking down into droplets following initial contact with respective teeth of the interior ring.

19. The reactor device of claim 17 wherein said different radials are opposite direction radials that fall on a common diametric.

20. The reactor device of claim 17 wherein the interior most positioned one of the one more stator and rotor rings is a rotor ring.

* * * * *